United States Patent [19]

Detwiler

[11] 3,998,078
[45] Dec. 21, 1976

[54] LIMITED TORQUE LOCKING FUEL CAP

[75] Inventor: Timothy Detwiler, Franklin Grove, Ill.

[73] Assignee: E. Edelmann & Co., Skokie, Ill.

[22] Filed: June 30, 1975

[21] Appl. No.: 591,932

[52] U.S. Cl. .................................. 70/171; 220/210
[51] Int. Cl.² ........................................ B65D 55/14
[58] Field of Search ........................... 70/165–171, 70/422; 215/9, 207, 217; 220/210, 288

[56] References Cited

UNITED STATES PATENTS

| | | | |
|---|---|---|---|
| 2,063,708 | 12/1936 | Swilens | 70/134 |
| 3,715,075 | 2/1973 | Blau et al. | 220/288 |
| 3,797,688 | 3/1974 | Porcelli et al. | 215/9 |
| 3,907,155 | 9/1975 | Smith et al. | 220/210 |

*Primary Examiner*—Paul R. Gilliam
*Assistant Examiner*—Victor Sakran
*Attorney, Agent, or Firm*—Norman Lettvin

[57] ABSTRACT

A limited torque cap is provided with a construction wherein a cam ring is located concentrically within a plurality of at least three radial movable jaws, normally biased inwardly and arranged to provide a driving connection with the cam ring until a predetermined level of torque is applied to the ring-jaw connection. A further construction is provided for effecting axial movement of the cam ring relative to the jaw members after a predetermined torque is achieved, whereby to prevent re-coupling of the cam ring and jaws and effectively "locking" the cap against further tightening to its connection and against removal. An "unlocking" feature permits selective restoration of the ring-jaw connection.

22 Claims, 20 Drawing Figures

LIMITED TORQUE LOCKING FUEL CAP

BACKGROUND OF THE INVENTION

This invention relates to a locking cap, and more particularly to limited torque cap that includes a locking character.

Locking caps desirably prevent unauthorized access to the interior of a capped structure, and are frequently used for capping gas tanks to prevent pilferage of gasoline from the tank or to prevent michievous introduction of foreign matter into the tank. Locking gas caps are well known in the art, such as U.S. Pat. No. 3,813,904.

A limited torque gas cap is also well known in the art and typically includes a threaded sleeve or connector member, arranged for screw-thread cooperation with the terminal end of the spout filler tube that extends from the tank, and a head member that is normally clutched, through a releasable connection, to the connector member. The releasable connection provides for relative movement, or overriding, of the head relative to the connector member, in the closing direction only, after a predetermined closing torque is achieved between the connector member and filler tube. Limited torque caps are disclosed in U.S. Patents such as U.S. Pat. Nos. 3,667,642; 3,715,075 3,815,776 and 3,820,680.

One object of this invention is to provide a locking limited torque cap which automatically locks upon reaching a predetermined torque without requiring additional or separate manipulation of the lock.

Another object of this invention is to provide a locking cap wherein attachment and locking are both effected through a screw-on motion of the cap, the locking occurring after a predetermined screw-on torque has been achieved.

A further object of this invention is to provide a combination limited torque and locking cap wherein use of a key is required only to effect unlocking of the cap after it has been manipulated to the locking condition.

It is still a further object of this invention to provide a torque responsive locking-cap of reliable and effective design and construction and which is simple to operate.

Still another object of this invention is to provide a combination limited torque and/or locking cap in combination with improved venting features for such a cap.

Other advantages of this invention will be readily apparent from the specific embodiments of this invention described below.

SUMMARY OF THE INVENTION

A headed locking limited torque cap is provided with a connector portion rotatable in the first direction for closing an opening, and rotatable in a second direction for disengaging from the opening. Means operatively associated between the cap's head and the connector portion act to automatically limit rotation of the connector portion of the cap, and to also lock the cap preventing removal, once a predetermined torque is achieved upon rotation of the cap in the first direction. The means may then be selectively manipulated through an unlocking operation to permit the cap to be removed by rotation thereof in the second direction.

In the invention herein the releasable connection between the head and spout-connecting portion of the cap, that provides a torque-responsive feature that limits the amount of attachment torque that can be applied in attaching the cap, is rendered inoperable to torque applied in the direction of removing the cap, thereby making the friction developed between cap and spout unalterable and appearing to lock the cap in the attached condition. The use of a key is caused to restore the releasable connection to its operable condition in which release torque may be applied, thereby appearing to unlock the cap.

A more detailed description of the invention is provided in the following description and claims and is illustrated in the accompanying drawings.

BRIEF DESCRIPTION OF THE DRAWINGS

FIGS 3, 4 and 5 are three similar vertical cross-sectional views through the assembled cap of FIG. 2, the cross-sectional views being taken through two intersecting vertical planes whose traces are substantially along angled lines 3—3 of FIG. 1, with FIG. 3 illustrating the arrangement of certain internal parts of the cap at a point in time just when the lock cylinder has been operated to change the cap's condition for the separable torque-transmitting elements of the cap, so that the cap is then unlocked to permit its selective removal from the connector terminus; and with FIG. 4 illustrating the arrangement of certain parts of the cap in their normal operative condition when the torque-transmitting elements are positioned to permit the cap to be screwed onto or off a screw-threaded connector; and with FIG. 5 illustrating the arrangement of parts of the cap after screw-on of the cap to a connector has achieved such a reaction torque as to cause separation of the torque-transmitting elements and to render the cap locked, in that the cap cannot be removed without first restoring the operative cooperation between the torque-transmitting elements as illustrated in FIG. 3;

DETAILED DESCRIPTION OF THE ILLUSTRATIVE EMBODIMENT

Referring now to the drawings, a limited torque cap, generally 10, is shown positioned upon an end portion of a connector 12 that could, for example, be the fill spout that leads to a gas storage tank of an automotive vehicle. While in the preferred form herein described the cap 10 is for use on the fill end of the filler tube for the gas tank of an automatic type vehicle, it will be understood that the invention is not necessarily limited to use in such an environment.

Figures 1, 2:
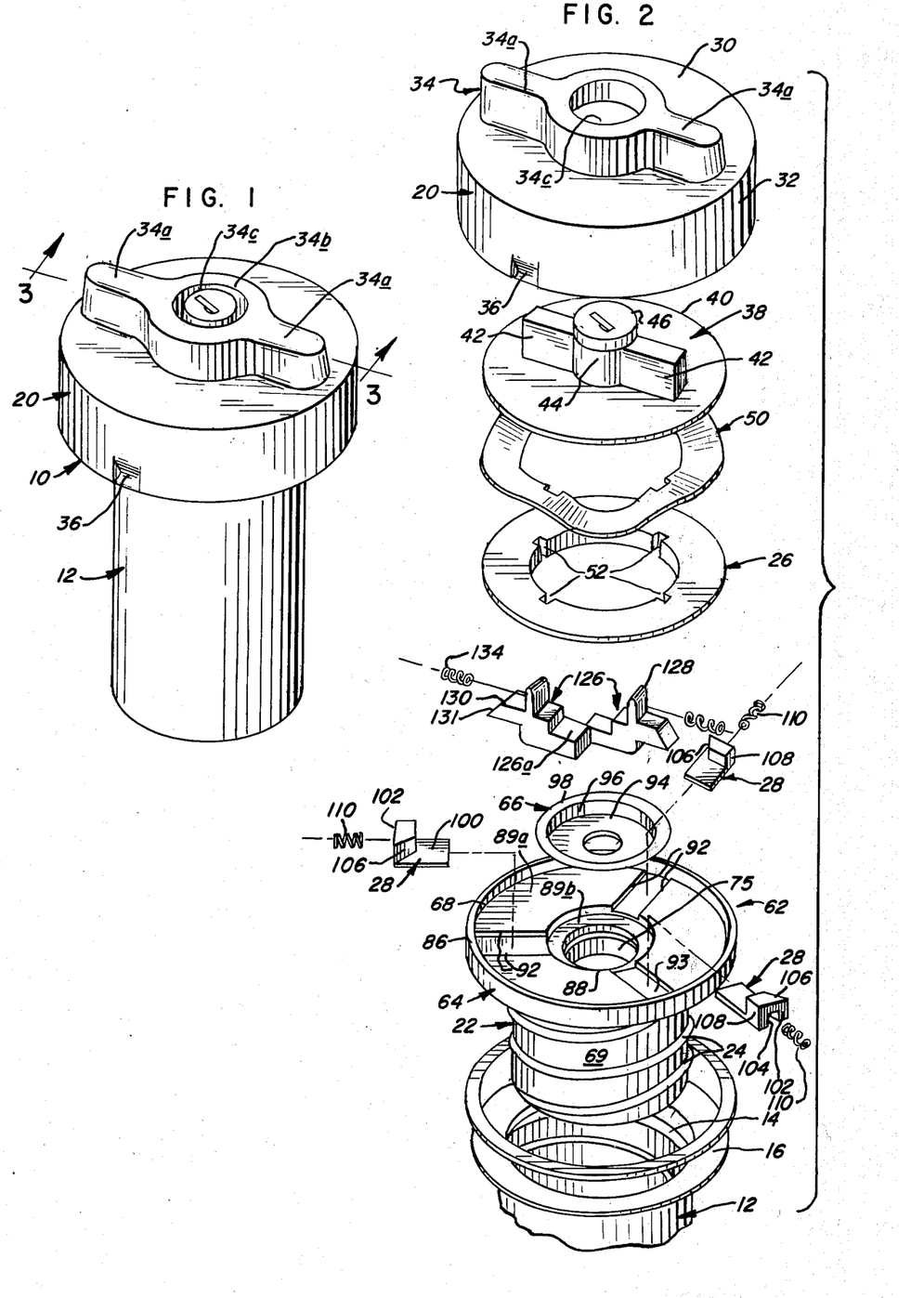
FIG. 1 is a perspective view of a locking limited-torque cap, more particularly a gas cap, constructed in accordance with the principles of the present invention and shown engaged with and upon an end portion of a filler spout for a storage tank.
FIG. 2 is an exploded perspective view of the cap of FIG. 1 illustrating principal sub-assemblies and portions of one form of cap embodying the features of the invention, and illustrating at the lower end of the Figure a fragment of the spout, or connector, terminus to which the cap is to be connected by a screw-on or twisting motion applied to the cap.

As shown in FIG. 2, the connector 12 to which cap 10 connects is provided with internal helical threads 14 to provide for screw-on connection by cap 10 to connector 12. The free end of connector 12 may be provided with an uppermost rim flange 16 adapted to engage and seal against an O-ring seal 18 that is carried on the underside of cap 10, all as is well known in the art, and whose description herein is for the purpose of setting the environment in which one preferred form of the cap may be used.

The use of a threaded, or inclined plane, type screw-on connection between a cap and a connector particularly provides an arrangement wherein reactive force developed between the parts being connected together increases with the amount of turning of the cap relative to the connector. So as not to apply too great a purchase, or grip, between cap and connector that would interfere with back-off or removal of the cap, or would result in too great compressive force against seal 18, it is desirable to provide a separable connection, or torque limiting clutch device, between portions of the screw-on member so as to limit the closing or attaching torque that is transmitted. The general concept, too, is old in the art, such as disclosed in the patents noted above and in eariler prior art such as U.S. Pat. Nos. 2,125,270 and 3,289,524.

In the instant invention, a specific and improved form of separable connection is provided within the cap to provide the cap with a torque limiting feature, and achievement of separation of the elements of the separable connection is further relied upon to, in effect, make the cap a locking cap.

The term locking as used herein differs somewhat from the usual concept or meaning of that term, as may appear from other environments. Usually locking is achieved by providing an element of one of two members arranged to cooperate with the other member to effect an interference, or force resistance, between the element and the two members so that until the element is withdrawn or altered the two members may not be released from the locked condition effected by the element. In this invention, the cap is caused to be locked, after a predetermined purchase, or frictional contact, has been effected between the cap and the part to which the cap connects, by making inoperative the means that normally would be utilized to effect removal of the cap. Conversely, in this application unlocking is achieved by restoring operability of the means through which removal of the cap may be effected in manipulation through its usual and intended manner.

The cap 10, of FIGS. 2–7, is an elongated member having a head 20 at the upper, or one, end and a closure means 22 at the lower, or other, end. The closure means 22 is helically screw-threaded exteriorly at 24 for cooperation with the internal helical threads 14 of the connector. Within the cap 10 are separable elements including a cam ring, generally 26, that is arranged to be rotatable with head 20, and a plurality of radially movable, spring biased, jaws, or bolts, 28 having portions that are located circumferentially outwardly of ring 26 and are rotatable about the cap's screw-on axis with closure means 22. The jaws 28 are arranged to move inwardly toward or outwardly away from ring 26 depending upon (a) the resistance to screw-on developed between closure means 22 and connector 12–14, and (b) the spring force applied to jaws 28. This construction generally provides a limited torque cap of novel design.

In the particular form shown, the head 20 includes a sheet metal inverted, cup-shaped, crown cap drawn to provide: a transverse cup bottom 30, that serves as the upper abutment wall; a perpipheral skirt, or cup wall, 32 depending from abutment wall 30 and of an axial length to receive and hold the cap elements in assembled condition; and a hollow, upstanding rib 34 that is radially elongated and centrally enlarged and extends above wall 30 to provide a finger grip for effecting rotation of head 20 together with other portions of cap 10 about the longitudinal axis thereof. The elongated, upstanding, rib 34 is shaped to provide hollow spaced end sections 34a that merge with a central cylindrical hollow section 34b that surrounds a central aperture 34c, the latter for providing access therethrough to a lock cylinder as hereinafer described. After the parts of cap 10 are assembled, a plurality of at least three clamping shoulders 36 are formed, upset, indented, or otherwise provided on skirt 32 extending radially inwardly and in a plane parallel to but spaced from wall 30, for holding the cap elements securely in proper assembled condition between shoulders 36 and wall 30.

The upper sub-assembly includes a frame member, generally 38, molded of plastic, preferably Celcon, but also possibly of other plastics such as Delrin, to provide a circular abutment plate 40, of greater diameter than the total radial length of rib 34. Rib means 42 and sleeve means 44 molded integral with plate 40 and extending thereabove are shaped respectively for telescopic cooperation with the hollow means on head 20, with the two rib means 42 entering hollow ribs 34a to provide for keying head 20 and sub-assembly 38 together for rotation, and sleeve means 44 arranged to enter center cylindrical section 34b. The sleeve means 44 is constructed to receive the barrel of a lock cylinder 46 to position the key-entry end of the cylinder 46 in alignment with aperture 34c of head 20. The lock cylinder 46 has an enlarged head at its upper end engaging shoulder means 44a sleeve means 44. A C-ring retainer 48 received in a peripheral groove of lock cylinder 46 is provided to extend laterally outwardly and to overlie an end 44b of sleeve means to prevent dislocation of the lock cylinder.

Figures 3, 4, 5:
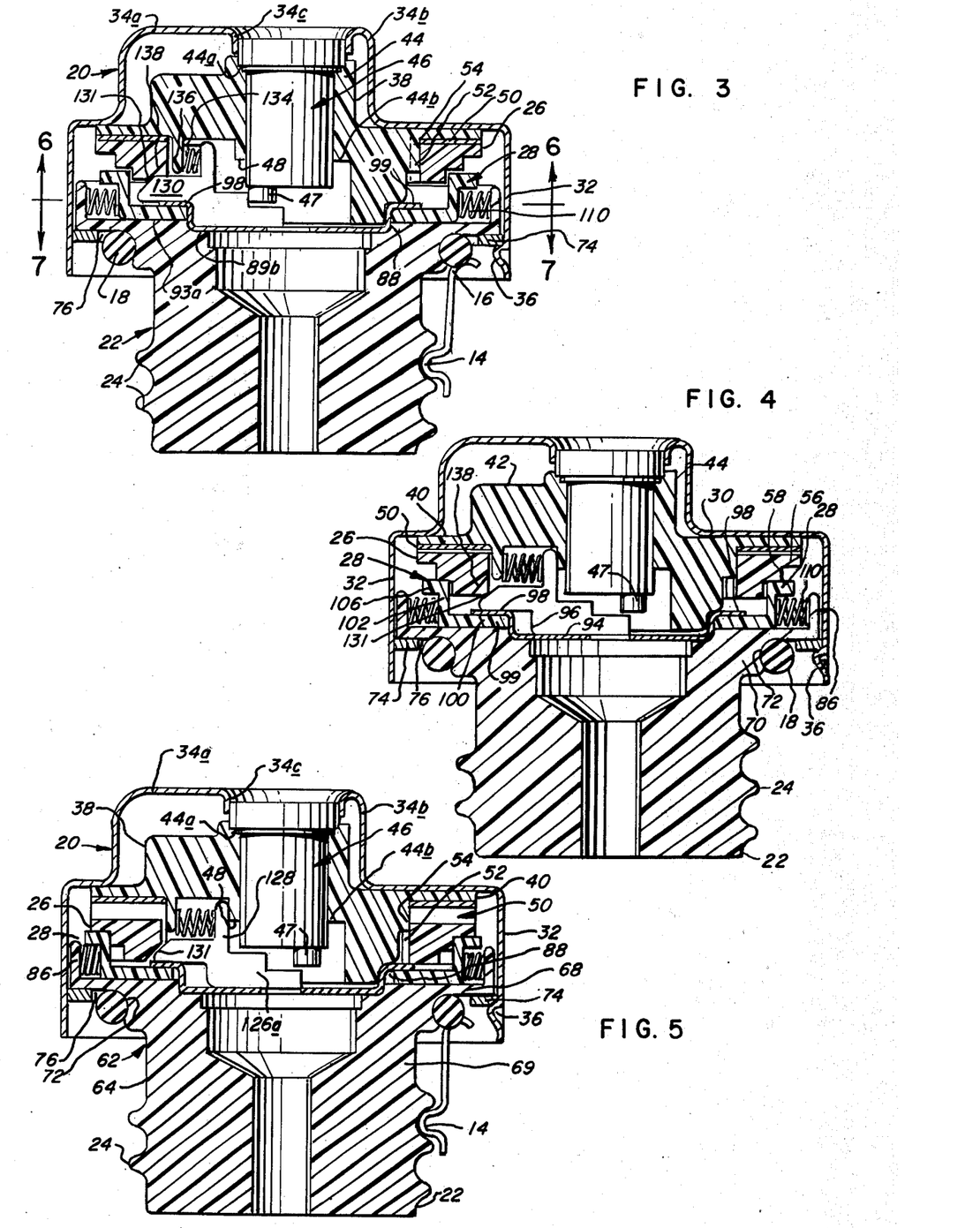

The upper side of abutment plate 40 engages the underside of transverse wall 30 of head 20. The outermost annular portion of the underside of abutment plate 40 has a washer-type spring element 50 abutting thereagainst with the spring 50 positioned between abutment plate 40 and cam ring 26. The periphery of spring element 50 is normally sinuous so that a first set of spaced abutment portions engage the underside of plate 40 and a second set of other abutment portions, spaced intermediate said first set of portions, engage the upper side of cam ring 26. When the washer spring has expanded, the spring's bias operates toward moving cam ring 26 axially away from abutment plate 40 so that a maximum spacing between ring 26 and plate 40 may be achieved as seen in FIG. 5. When spring 50 is maximally compressed against the spring bias, the spacing between the cam ring 26 and plate 40 is substantially as seen in FIG. 3, but in normal operation the spring is partially potentialized by the spacing as shown in FIG. 4.

Figure 6:
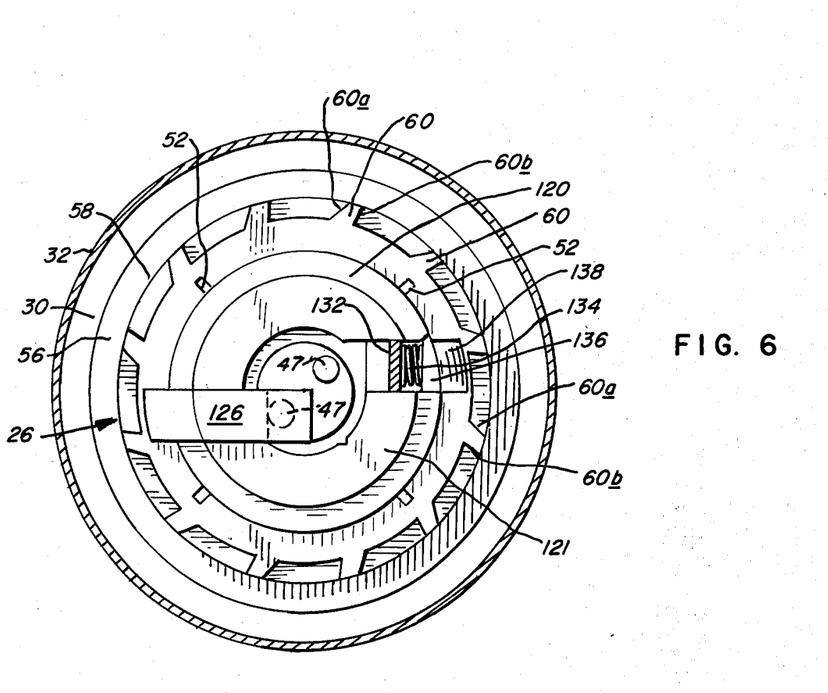
FIG. 6 is a cross-sectional view taken looking upwardly substantially along line 6—6 of FIG. 3.
Figure 7:
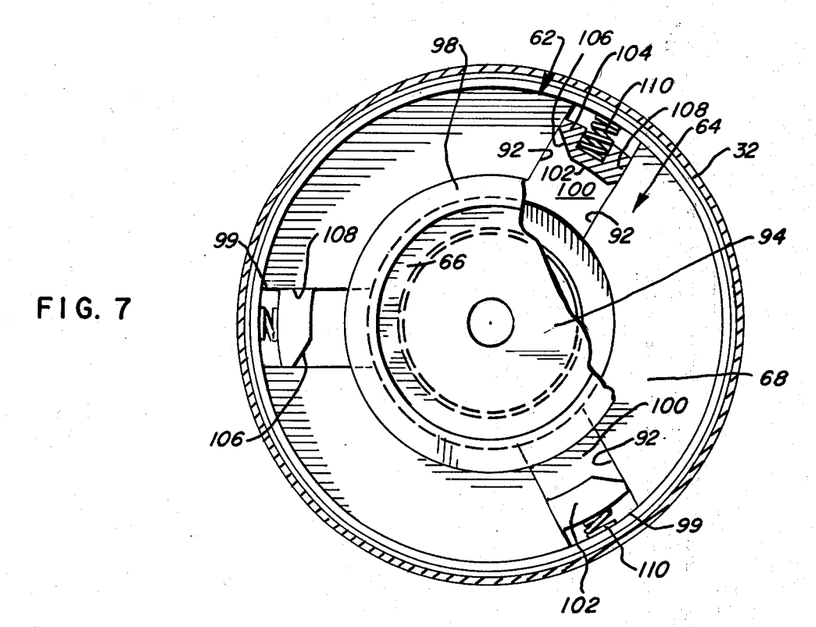
FIG. 7 is a cross-sectional view taken looking downwardly substantially along line 7—7 of FIG. 3.

The cam ring 26 is provided with a plurality of axially extending spline grooves 52 along the inner cylindrical wall for slidingly receiving ribs or teeth 54 formed integrally on the sub-assembly frame member 38, so that a driving connection is maintained between members 38 and 26 for the entire range of expansion of spring 50. The outer circumference of cam ring 26 is shaped to provide two axially spaced steps, as clearly seen in FIGS. 3-5, where jaws 28 are shown engaging the lowermost step in FIGS. 3 and 4 but engaging in the uppermost step in FIG. 5. In the uppermost step closest to spring 50, there is an outermost smooth annular surface 56 facing downwardly and a smooth cylindrical surface 58 facing outwardly. The lowermost step is of a lesser diameter than surface 58 and in the lower step are located a series of ribs 60, equally circumferentially spaced to provide recesses each of a size to receive between each pair of ribs one of the jaws 28. Each rib 60, as best seen in FIG. 6, has an inclined camming, or ramp, edge or side 60a on the margin of the rib facing in the direction of clockwise, or screw-on, rotation of the head 20. The trailing edge 60b of each rib is at an angle to present a substantially square abutment, so as to obviate camming action with a jaw 28 that enters between a pair of ribs 60.

The intercooperation between jaws 28 and ribs 60 of cam ring 26 provides a separable connection in which jaws 28 may be cammed over ribs 60, during screw-on, against the bias of spring means once a predetermined screw-on torque, or resistance, has been achieved between helical threaded closure means 22 and helical threaded connector 12-14. The connection between jaws 28 and cam ring 26 normally would permit screw-off of the cap without separation of the connection occurring.

The axial length of upper sub-assembly frame member 38 in the downward direction away from abutment plate 40 varies depending upon certain functions described hereinafter, but in the main the axial length of portions of member 38 is selected to accommodate and provide for proper lateral movement of the bolts operated by the lock cylinder 46, the latteral movement of jaws 28 and the axial movement of cam ring 26.

A bottom sub-assembly, generally 62, provides as part thereof the closure means 22 and the movable jaws 28. The bottom sub-assembly 62 includes an axially elongated unitary member 64 molded of plastic, preferably Celcon, but possibly of other plastics such as Delrin, and a cup-shaped retainer 66 of metal whose depresseed portion enters into a depressed section defined in the upper side of plastic member 64. The plastic member 64 provides an upper transverse plate portion, generally 68, molded integral with a downwardly extending, centrally bored through, or sleeve-like, attachment member 69 with helical threads formed on the outer surface thereof to define said closure means 22 screw-threaded at 24. An enlarged exterior shoulder 70 at the junction between attachment member 69 and plate portion 68 is shaped to provide an annular groove-seat 72 for receiving thereinto the O-ring seal 18.

In the assembly of the cap 10, the radial outermost section of plate portion 68 is underlain by a metal ring 74, of brass or the like, that is of a diameter slightly greater than the maximum diameter of plastic plate portion 68 so as to lie adjacent the wall of skirt 32, serving to protect the plastic part 64 from distortion during final assemblage when shoulders 36 are depressed, or offset, inwardly to clamp axially against ring 74 to hold the sub-assembly parts of the cap under axial compression except for the parts that are intended to be movable within the cap. The ring 74 is of a size to be spaced from O-ring to provide a venting passageway 76 therebetween. The ring 74, frictionally engaged by the shoulders 36 rotates with head 20, and lesser friction between ring 74 and plastic part 64 permits rotation and sliding of ring 74 relative to part 64 when the clutch elements of the cap are disengaged and the upper portion of the cap rotates relative to the lower portion of the cap.

Within attachment member 69 and below plate portion 68, the plastic sub-assembly member 64 is shaped to provide a constantly open bore, or venting passage 75 which, in the modified form shown in FIGS. 8 et seq. described hereinafter, venting valve means may be positioned. Venting will occur through the form of cap shown in FIGS. 1-7, since there are no seal surfaces to prevent such venting.

The top plate 68 of molded member 64 is provided at its outer periphery with a circular, upstanding, outer flange 86 that lies fairly closely to but is spaced from the inner surface of skirt 32 of head shell 20. The upper face of member 64 is shaped to define upper and lower support surfaces spaced by a circular wall, or shoulder 88 that is positioned concentrically inwardly of circular flange 86. The upper support surface is 89a and lower support surface is 89b. Three sets of generally radial guide shoulders 92 of lesser axial height than shoulder 88 extend between concentric shoulder 88 and flange 86. Each set of two guide shoulders 92 are parallel to each other to define a radial guide way 93 for radial movement of a jaw 28 that is located between each pair of guides 92. The guide way 93 has a lower wall 93a located in a plane spaced between the planes of support surfaces 89a and 89b.

The cup-shaped retainer 66 is shallowly dished from sheet metal and provides a depressed central surface 94 surrounded by upstanding cylindrical cup side wall 96 that merges with an outwardly extending annular flange 98. The outer diameter of cup side wall 96 is slightly greater than the inner diameter of circular wall 88, so that the retainer 66 when press fit into the recess surrounded by wall 88 is held securely in position with flange 98 substantially abutting the upper support surface 89a. The flange 98 cooperates with the spaced underlying plate 68 and with the sets of parallel guide shoulders 92 to define radially extending sockets 99 each for receiving and retaining a portion of jaw 28 as jaws 28 reciprocate.

Each jaw 28 includes a lower elongated mounting leg 100 and an upstanding jaw part 102 whose outermost side is recessed at 104 to serve as a spring retainer on the outside of part 102. The leading edge of jaw part 102, in the direction of clockwise rotation by the cap 10, is inclined or cammed at 106, while the trailing edge is substantially square at 108. A spring 110 is positioned between the flange 86 and the recessed outer side of jaw part 102. The thickness, or height, of mounting leg 100 is less than the spacing between retainer flange 98 and surface 93a to permit free movement of mounting leg 100 in the socket 99 provided therefor.

The circumferential width of each jaw part 102 is less than the spacing between each pair of ribs 60 on the cam ring 26. The springs 110 bias all three jaws 28 radially inwardly, and normally engagement of the cam ring 26 with the jaw portions 102 operates to provide a clutch or driving connection between the parts such that torque applied to head 20 is transmitted through cam ring 26 to jaws 28 and thence to lower member 64 so that the entire cap 10 will rotate as a unit. When torque resistance developed between closure means 22 and connector 12 reaches a predetermined design level that takes into account the force constant of springs 110 and the angles of incline of jaw surface 106 and of rib surfaces 60a, then overriding or ratcheting of the jaws relative to the ribs 60 will occur and no further torque will be transmitted from head 20 through the lower portion of cap 10, because the jaws 28 have de-clutched or moved outwardly from a cooperative engagement with ribs 60 of cam ring 26.

As jaws 28 move outwardly of ribs 60 they move to a circumferential position where the bias of spring 50 is then capable of moving cam ring 26 from the position of FIG. 4 to the position of FIG. 5. In the FIG. 5 position, further rotation of the head 20 in either direction is free of corresponding movement of the lower portion of cap 10 because cam ring is effectively disconnected from a driving relation with jaws 28, and in effect the cap 10 is locked in position by frictional engagement of sleeve 22 to connector 12, and cap 10 cannot be withdrawn or removed by normal screw-off operation of the cap.

Referring now to the means to permit removal of the cap, reference is had to FIGS. 2–6. The lower end of the unitary, molded, upper sub-assembly frame member 38 is provided with a downwardly extending, generally cylindrical abutment 120 and a concentric depending portion 121. The abutment 120 engages the flange 98 of retainer 66 when the cap is assembled. As seen in FIG. 6, there are channels defined through abutment 120 and portion 121 in which lock bolts 126 may reciprocate.

Lock bolts 126 are provided for actuation by lock cylinder 46. As is standard construction for a lock cylinder, the cylinder 46 is provided with a pair of downwardly extending studs 47 arranged for cooperation with oppositely, reciprocably, movable lock bolts. To take advantage of such standard construction, lock bolts 126 have been shaped to provide a base portion 126a with a first upstanding portion providing an abutment shoulder against which a stud 47 moves as lock cylinder 46 is pivoted. As the lock cylinder is pivotly actuated after being unlocked by insertion of a key, movement of a stud 47 is translated into movement of a lock bolt 126 against the return bias of a spring. The lock bolt's base portion 126a is selected of a size to fit within the depressed portion of cup 66 and all movement of 126a is confined to that space. Each lock bolt 126 includes a second upstanding portion, namely flange 128, and an outwardly extending tongue 130 below flange 128.

A recess 132 is formed in a frame member 38 to receive a helical compression spring 134 that is positioned axially between bolt flange 128 and a radially outwardly abutment 136 formed on frame member 38. The outwardly extending tongue 130 of lock bolt 126 underlies recess 132 tending to confine spring 134 in its recess 132. The tongue 130 slides over flange 98 and is confined for reciprocal movement in the channel provided in the underside of member 38. The upper surface of the forward end of tongue 130 is inclined at 131 to provide a wedge shape.

Return of lock bolt 126 to its retracted position is effected by bias of spring 134 and return is limited by abutment of flange 128 against frame member 38 as seen in FIGS. 4 and 5.

The inner periphery of cam ring 26 is provided with two inclined cam surfaces 138 positioned to be engaged by the wedge shaped forward ends 131 of the tongues 130 of the two bolts 126. Upon actuation of lock cylinder 46 from the position of FIG. 5 to FIG. 3, the wedge shaped ends of bolts 126 engage cam surfaces 138 and force cam ring 26 upwardly compressing spring 50, and cam ring 26 may then be rotated until jaws 28 are properly aligned to effect clutching, at which point the bias of springs 110 operates to move jaws 28 radially inwardly to their clutching position between pairs of ribs 60 defined on the cam ring 26. Then, upon torque applied counter-clockwise to head 20, the cap 10 can be removed, or is effectively unlocked from frictional contact with connector 12.

In the second form of the invention illustrated in FIGS. 8–20, a more refined version of cap is disclosed in greater profusion of Figs. for greater clarity of constructional detail and to add certain revisions. In the main, however, the parts are substantially the same, and similar parts are given the same reference numbers as used in describing the first form of device shown in FIGS. 1–7. Where a modification of an element is shown the reference numeral is the same but primed.

Figure 8:
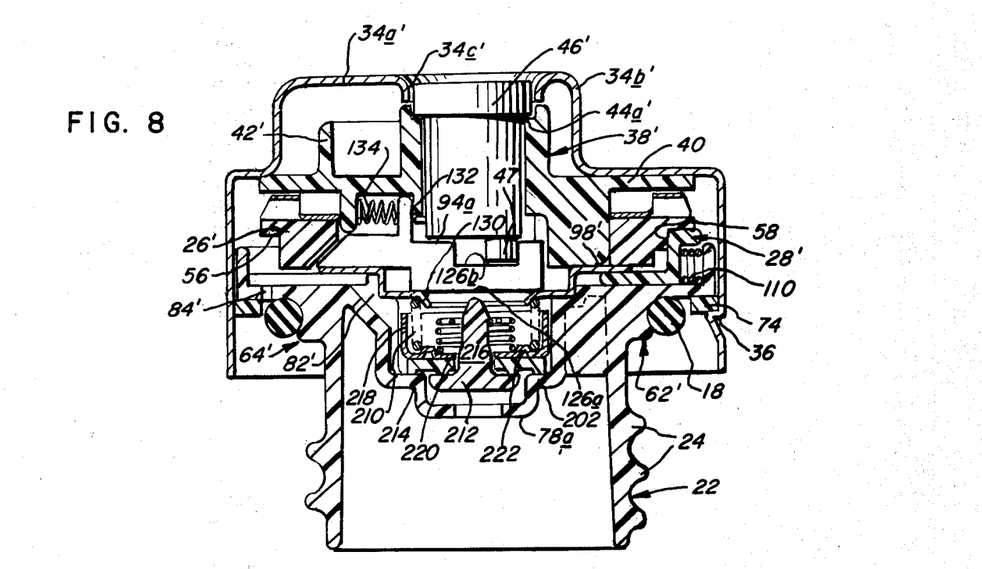
FIG. 8 is a vertical cross-sectional view substantially similar to the view shown in FIG. 5, but illustrating another form of the invention employed in a form of cap provided with improved venting features for the cap.
Figure 9:
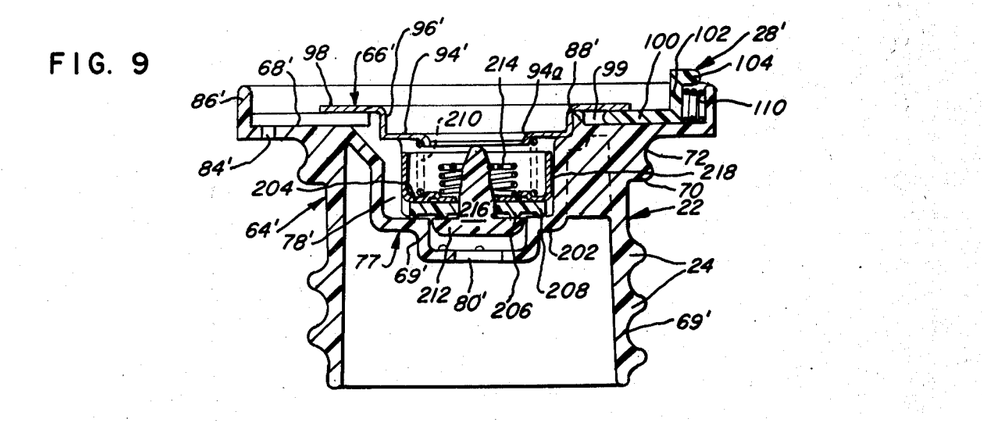
FIG. 9 is a vertical cross-sectional view of the bottom housing sub-assembly illustrated as part of the cap of FIG. 8.
Figure 10:
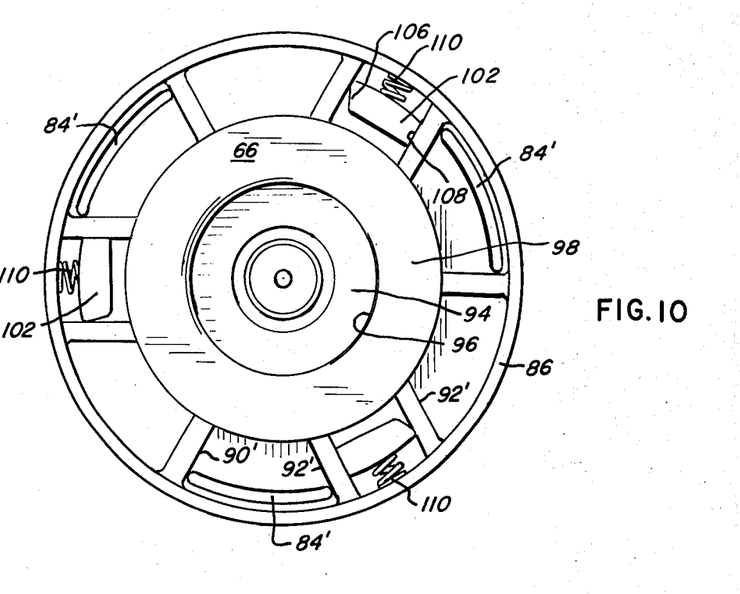
FIG. 10 is a bottom plan view of the sub-assembly of FIG. 9.
Figure 11:
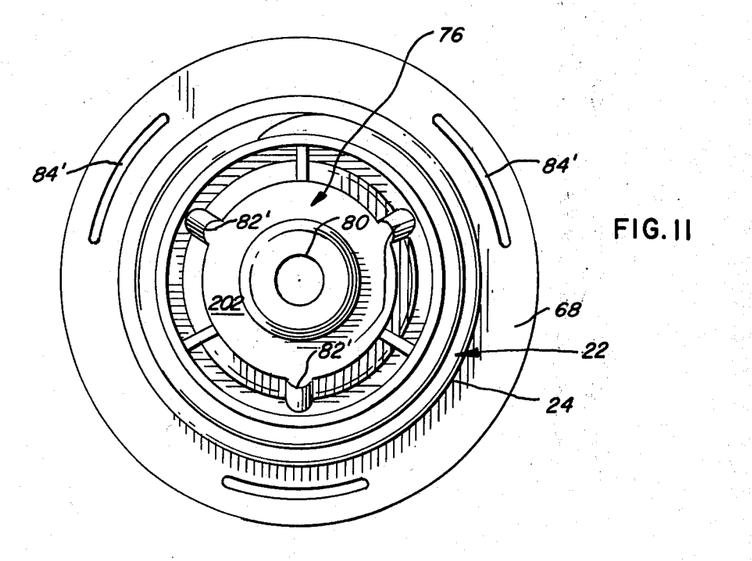
FIG. 11 is a top plan view of the sub-assembly of FIG. 9.
Figure 12:
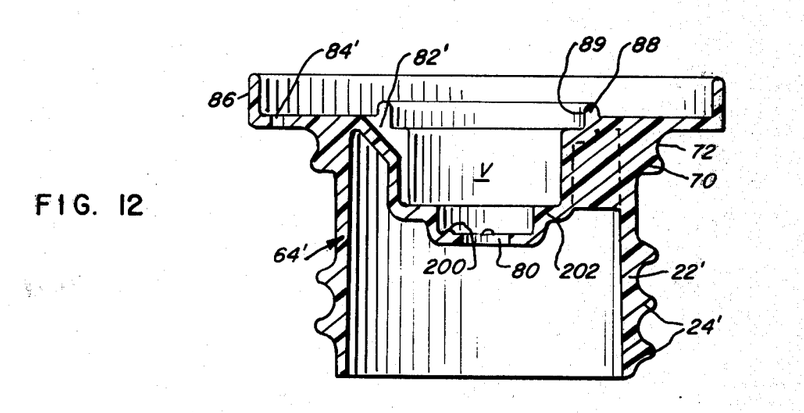
FIG. 12 is a vertical cross-sectional view of the molded bottom housing part that serves as the principal structural member, or frame, for the sub-assembly of FIG. 9.
Figures 15, 16:
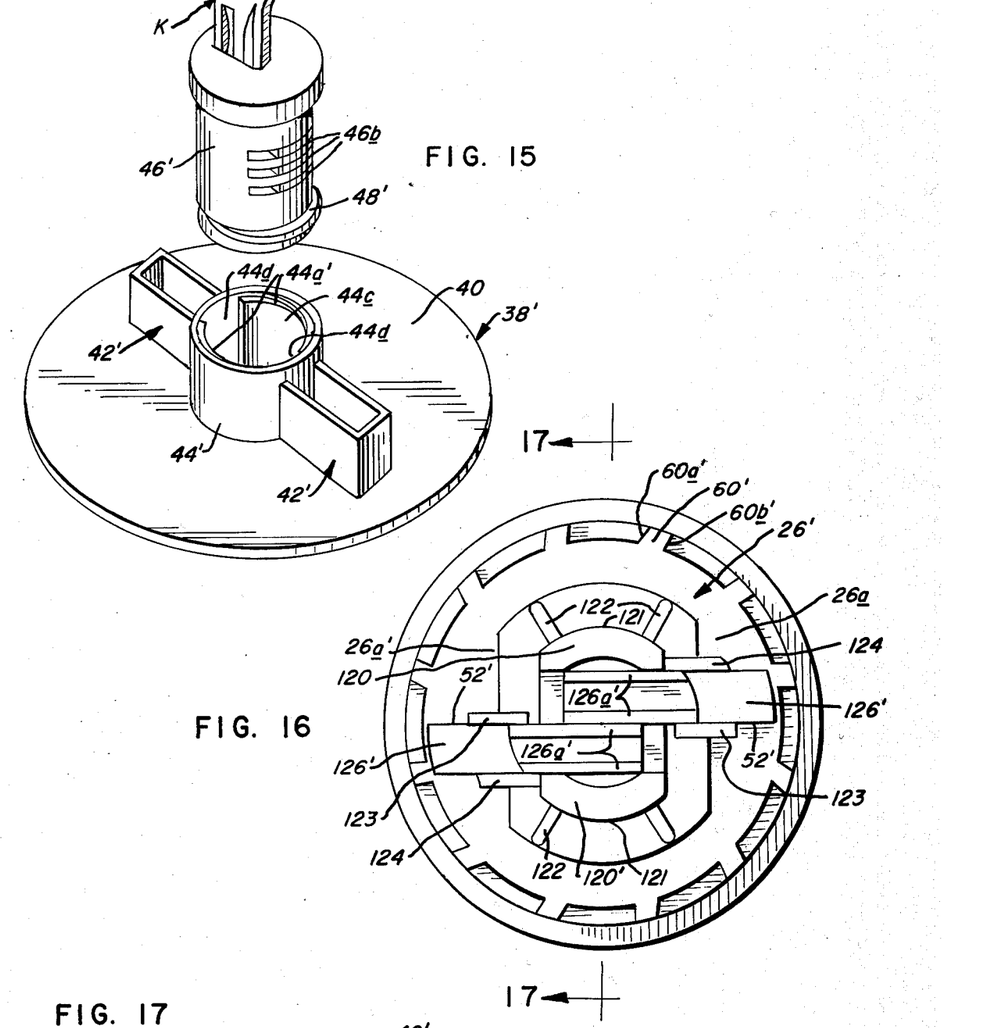
FIG. 15 is an enlarged exploded perspective view of the molded top housing part, that serves as the principal structural member, or frame, of the sub-assembly of FIG. 14, and the lock cylinder that enters thereinto.
FIG. 16 is a bottom plan view of the sub-assembly seen in FIG. 14.

As seen in FIGS. 8 and 15, the upper sub-assembly's upstanding rib means 42' are formed hollow to provide peripheral walls and to save material, and the sleeve means 44' are provided internally with a pair of circumferentially spaced, arcuate bosses 44c whose axial ends provide a shoulder 44a' for receiving and seating the enlarged head of lock cyliner 46'. The spaced bosses define outwardly enlarged, diametrically disposed sideways 44d for receiving thereinto the elements of lock plates 46b that project outwardly of cylinder 46' when the lock is in locked position. The key K, when inserted, retracts plates 46b to within the cylinder 46' so that cylinder 46' may be rotated to actuate lock bolts 126. The cylinder 46' carries a spring loaded lock ring 48' that springs outwardly to act to prevent inadvertent displacement of cylinder 46' after lock ring 48' has passed surface 44b'.

As another modification, the key-way or splining between cam ring 26' and upper sub-assembly 38' to permit axial movement of cam ring 26' is achieved by two large, axially extending recesses 52' that are provided in the inner periphery of radially enlarged portions 26a' of cam ring 26', and into which extend portions of the frame member 38'. In particular, the frame member 38' is molded to provide outwardly extending ribs 123' and 124' which serve a dual purpose, that of guiding lock bolts 126 for generally radial reciprocal movement and secondly for splining between frame member 38' and cam ring 26' to insure that they rotate together while permitting ring 26' to move axially in opposite directions relative to frame member 38'.

Figure 17:
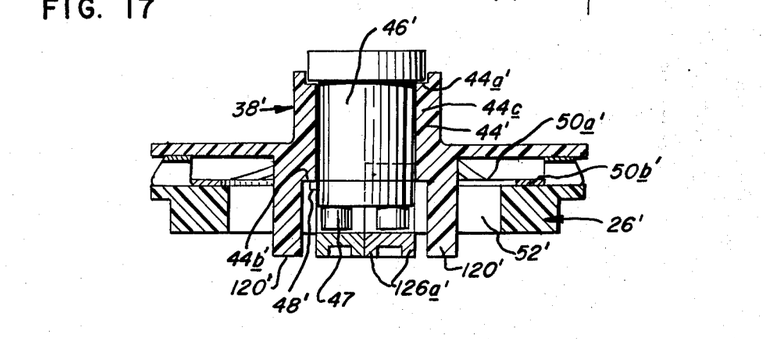
FIG. 17 is a view of the sub-assembly of FIG. 14 taken substantially on line 17—17 of FIG. 16 and also showing the ring spring expanded axially.
Figure 18:
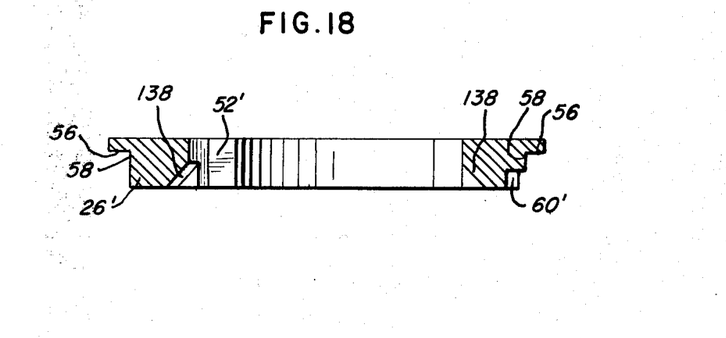
FIG. 18 is a cross-sectional view of the molded cam ring part shown in FIGS. 14, 16 and 17.

In other modifications, the lower end of upper frame member 38' has been molded in such a manner as to provide discernible elements that provide functions while reducing the amount of plastic used in the molded part. Thus, as best seen in FIGS. 16, 17 and assembly view, FIG. 8, the lower end of member 38' provides two downwardly extending abutment projections 120', radially extending rigidifying ribs 122 and lock bolt guide ribs 123–124. The two projections 120' each have an arcuate outer surface 121 with a diameter of cupside wall 96'. These projections 120' extend downwardly into the depressed center portion of cup 66' and engage bottom wall 94' thereof. The ribs 122 and lock bolt guide ribs 123–124 extend outwardly of the circle of the surfaces 121 and extend downwardly an extent only sufficient to engage the upper surface of flange 98'. This combination of elements on frame member 38 entering and engaging cup shaped retainer 66 are such as to provide a secure and stable abutment betwen upper and lower body members much in the nature of a surface to surface abutment.

The lock bolts 126' themselves are modified over those shown in the first form of construction. Lock bolts 126' have their base portion 126a provided with spaced upstanding portions at opposite ends of a recess 126b into which extends the stud 47 of a lock cylinder. The spaced upstanding portions are positioned to be alternately engaged by stud 47 as the lock cylinder is pivoted in opposite directions. This arrangement provides for positive return of the lock bolts 126' to retracted position. Also, to reduce friction, the bottom surfaces of portion 126a of lock bolts 126' are shaped to define spaced runners 126a' separated by a recess.

Figure 19:
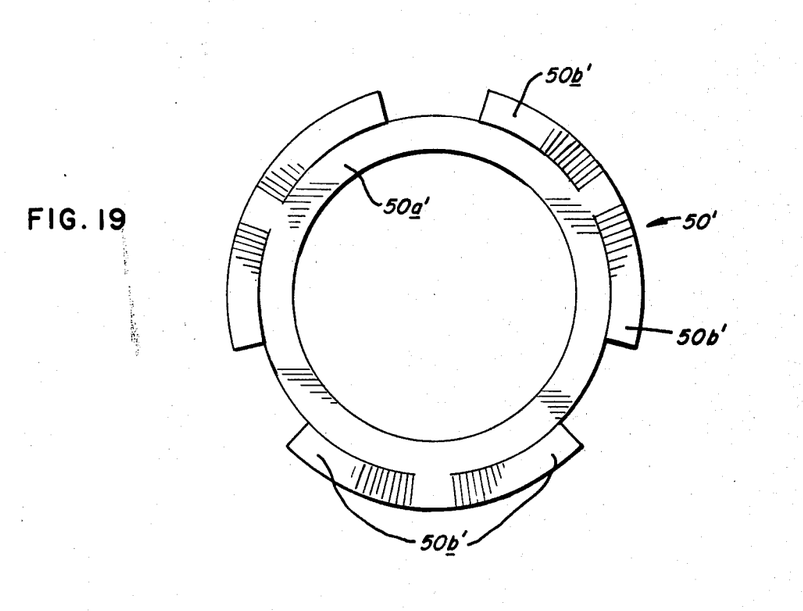
FIG. 19 is a top plan view of the ring spring shown in FIG. 17.
Figure 20:
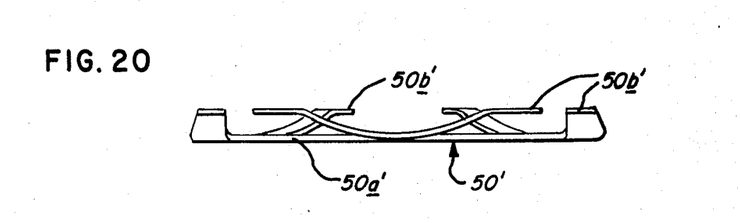
FIG. 20 is a side elevational view of the spring of FIG. 19.

Still another modification is providing spring ring 50' in the form of two concentric portions, an inner flat annular portion 50a' and a segmented outer ring portion 50b' whose segmenting permits circumferential movement of the free ends of the segments toward and away from each other as the spring is compressed or expanded axially. The segmenting of the outer ring portion 50b' provides three circumferential spaces as shown in FIG. 19.

In the form of invention shown in FIG. 8 et seq, a substantial number of revisions in the frame part 64' have been effected for the principal purpose of lessening the amount of plastic used in the molded part 64' and for providing improved vent means for the cap.

The part 64' includes attachment member 69' shown shaped to provide a depending chamber structure 77 which surrounds a chamber space 78' for receipt thereinto of a venting valve. The depending structure 77' is shaped to define a lowermost vent opening 80' communicating with the interior of sleeve 69' and through chamber space 78' with upwardly extending internal vent passageways 82' that provide for venting communication laterally outwardly across the upper surface of plate portion 68' with downwardly extending, circumferitirally disposed, apertures 84' that extend through plate 68' to communicate with venting passageway 80'.

The top plate of 68' is provided with an inner cylindrical wall provided by upstanding rib 88', and instead of shoulder surfaces of thick molded construction as in the prior form, ribs 90' and92' are provided extending between rib 88' and flange 86', the ribs 92' serving as guides that define guide ways for movement of jaws 28 located between pairs of ribs 92'. The upper edges of ribs 88', 90' and 92' lie in a plane serving as the equivalent of upper support surface 89a in the previous form of construction.

Figure 13:
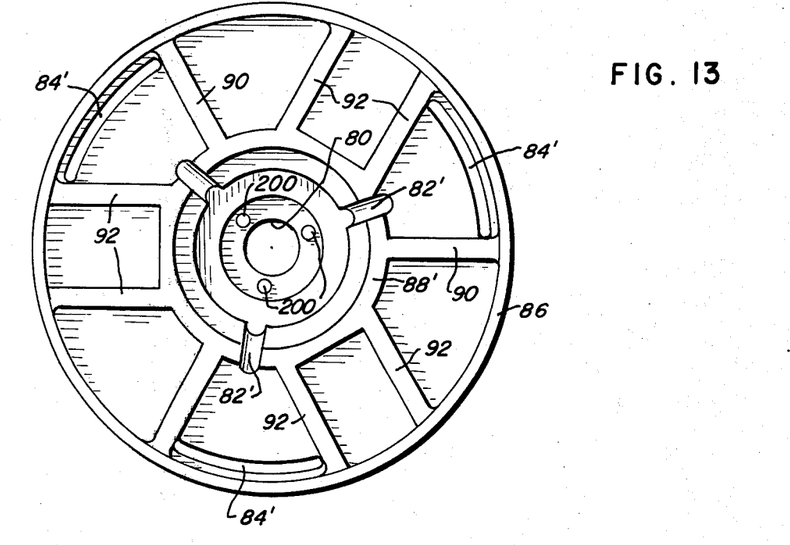
FIG. 13 is a top plan view of the molded part shown in FIG. 12.
Figure 14:
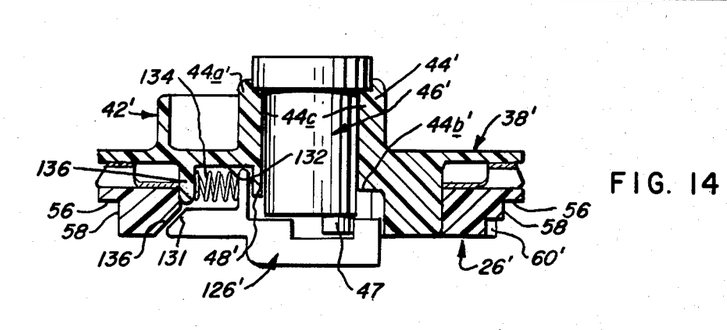
FIG. 14 is a vertical cross-sectional view of the top housing sub-assembly and associated cam ring illustrated as part of the cap of FIG. 8, showing the lock cylinder and a bolt operated thereby in elevation but with the ring spring omitted.

In the bottom sub-assembly 62', three vent apertures 84' are provided through plate 68' and each is radially aligned with one of the vent passageways 82' which extend through and across inner circular rib 88', as best seen in FIG. 13. As best seen in FIG. 8 the vent apertures 84' communicate with the open space between ring 74 and O-ring 18. The number of assembly shoulders 36 may be increased to reduce the amount of radial inward offset of such shoulders. While three shoulders 36 have been shown, in a preferred form, six such shoulders 36 may be used with the smaller radial inward offset required, the latter construction functioning without the danger of cracking the chrome plate of the head 20' during drawing.

In bottom sub-assembly 62', the depending structure 77 and chamber space 78' is shown occupied by a venting and vacuum-relief valve construction, whose detailed construction is now described. Surrounding vent opening 80' are three circumferentially spaced, upward projections 200 which serve as a seat for a valve member under vacuum-relief conditions such that opening 80 is never closed off. Depending structure 76' provides an upper annular seat 202 and a lower recess 78a below seat 202. A valve disc 204 of resilient material, with a pair of spaced concentric downwardly extending sealing ribs 206 and 208 on the disc's underside, is held against seat 202 by an outer heavier, or stronger, spring 210, with outer rib 208 sealing against seat 202. The inner rib 206 is adapted to be engaged by the head 212 of a movable, stemmed, valve member. An inner helical coil spring 214 of lesser spring constant than spring 210 normally engages a portion of stem 216 to bias head 212 of the valve to seal against inner rib 206. The valve disc 204 is backed by securement to a metal, cup-shaped, member 218 with an annular base whose inner edge is captured by a connecting rib 220 defined on disc 204. An upwardly-offset rib portion 222 on the bottom wall of cup member 218 and spaced between the cup's side wall and rib 220, operates to provide both a first confining means for the lower end of inner spring 214 and a second, or outer, confining means for the lower end of outer spring 210. A downturned flange 94a on cup-shaped retainer 66 serves to locate and center the upper end of outer spring 210.

Under vacuum conditions, stemmed valve head 212 moves downwardly against the bias of spring 214 away from inner seal rib 206, but projections 200 maintain an open venting passageway that includes apertures 84', passageways 82', passageways around the upper end of cup 218, past the stem of valve head 212, past valve head 212, and projections 200 through vent opening 80. When excessive pressure is developed below opening 80, the valve disc 204 together with valve 212 moves upwardly as a unit, against the bias of spring 210, away from seat 202 to permit venting.

It will be appreciated that numerous changes and modifications can be made to the embodiments disclosed herein without departing from the spirit and scope of this invention.

What is claimed and desired to be secured by Letters Patent of the United States is:

1. A locking limited torque cap, comprising, in combination:
closure means rotatable in a first direction for selectively closing an opening, and rotatable in a second direction for disengaging from said opening; and
separable drive means operatively associated with the closure means for automatically separating and preventing rotation of the closure means in the second direction once a predetermined torque is achieved by rotation in the first direction, the separated drive means thereafter being selectively manipulable back to their non-separated condition to permit the closure means to be rotated in the second direction.

2. A locking limited torque cap, comprising, in combination:
closure means rotatable in a first direction for selectively closing an opening, and rotatable in a second direction for disengaging from said opening;
drive means operatively associated with the closure means for automatically preventing rotation of the closure means in the second direction once a predetermined torque is achieved by rotation in the first direction, the drive means thereafter being selectively manipulable to permit the closure means to be rotated in the second direction, the drive means including separable drive elements operatively associated with the closure means for driving said closure means both in the first and second directions, prior to development of said predetermined torque, by rotation in said first direction, and the automatic prevention of further rotation of the closure means, said separable drive elements including a cam ring, a plurality of jaw means disposed outwardly of the cam ring, spring means biasing the jaw means toward the cam ring, and manually selectively operable bolt means positioned for operative association with the cam ring.

3. A cap as in claim 2 wherein the separable drive means are separable by axial movement of the cam ring and, when separated, operates to prevent rotation of the closure means in both said first and second directions, the preventing of rotation in the first direction operating to limit the maximum closure torque that may be applied to the closure means.

4. A cap as in claim 1 including a manually graspable head operatively associated with the closure means, first clutch means operatively associated with the manual graspable head and constructed and arranged for cooperation with a second clutch means for driving the closure means selectively in the first and second directions prior to achievement of the predetermined torque that then operates to prevent rotation of the closure means, said second clutch means operatively associated with the closure means, first spring means resiliently urging the first clutch means axially toward the second clutch means, second spring means resiliently urging the second clutch means radially inwardly toward the first clutch means, and shoulder means provided on one of the two clutch means for effecting separation of the two clutch means after the predetermined torque is achieved, so as to thereafter automatically prevent the closure means from being rotated in both the first and second directions.

5. In a limited torque screw-on cap of the type including two cap elements operatively associated with separable clutch elements that are normally engaged so that torque applied about a longitudinal axis and applied to one cap element is transmitted through the clutch elements to the other cap element, but which clutch elements are arranged to become automatically disengaged to permit the one cap element to rotate relative to the other cap element upon achieving a predetermined resistance to torque; the improvement comprising, in combination:
a first clutch element rotatable with one of the two cap elements, a plurality of second clutch elements rotatable with the other cap element, the second clutch elements having cam surfaces and being disposed outwardly of the first clutch element considered relative to said longitudinal axis and being spring biased radially inwardly toward clutching engagement with said first clutch element in directions toward said longitudinal axis.

6. A cap as in claim 5 wherein the first clutch member is a ring-like element, and the second clutch members are jaw-like elements that are arranged to move generally radially of said ring-like element.

7. In a limited torque screw-on cap of the type including two cap elements operatively associated with separable clutch elements that are normally engaged so that torque applied about a longitudinal axis and applied to one cap element is transmitted through the clutch elements to the other cap element, but which clutch elements are arranged to become disengaged to permit the one cap element to rotate relative to the other cap element upon achieving a predetermined resistance to torque; the improvement comprising, in combination:
a first ring-like clutch element rotatable with one of the two cap elements, a plurality of second jaw-like clutch elements rotatable with the other cap element, the jaw-like clutch elements being disposed radially outwardly of the ring-like clutch element and being spring biased generally radially inwardly toward clutching engagement with said ring-like clutch element, and the ring-like clutch element being splined to one of the two cap elements so as to be rotatable therewith and being movable axially of the jaw-like clutch elements between a first position, in which clutching with the jaw-like elements may occur, and a second position in which clutching between the ring-like and jaw-like elements will not occur.

8. A cap as in claim 7 including spring means normally biasing the ring-like clutch element toward the second position.

9. A cap as in claim 8 wherein the jaw-like clutch elements are normally positioned to block movement of the ring-like clutch element toward the second position, but being movable outwardly to a non-blocking position against the radial spring bias upon a predetermined resistance to torque being achieved.

10. A cap as in claim 7 including restoring means carried by one of the two cap elements and selectively manipulable to permit the clutching elements to be restored from their condition in the second position to their condition of the first position.

11. A cap as in claim 10 wherein the restoring means includes reciprocating wedges, and a key-operated cylinder for selectively effecting movement of the ring-like clutch element axially.

12. A cap as in claim 8 including a selectively operable restoring means for selectively moving the ring-like clutch element axially from said second position in a direction past said first postion.

13. A cap as in claim 12 wherein the axial movement of the ring-like element in the direction away from the second position against the bias of the spring means to a point past the first position permits the jaw-like clutch elements to be repositioned, and radial spring means biasing the jaw-like clutch elements toward a blocking position that normally prevents movement of the ring-like element axially toward said second position.

14. A cap as in claim 7 wherein the other cap element is shaped and arranged to provide a shaped chamber that defines at least one valve seat therein, and a sub-assembled vacuum-and-venting valve means disposed in said chamber and operatively engaging said valve seat.

15. A cap as in claim 14 wherein the other cap element includes a plate-like member shaped to provide thereon guides for radial movement of the jaw-like clutch elements, and venting channels communicating with the vacuum-and-venting valve means.

16. A cap as in claim 7 wherein the other cap element is a sub-assembly carrying thereon a vacuum-and-venting valve means and the second clutch elements, and the one cap element being clamped against the other cap element by a cup-shaped, sheet metal, crown cap that is keyed to the one cap element for rotation therewith and provides thereon clamping shoulder means for embracing portions of said other cap element.

17. A cap as in claim 16 wherein a metal ring is interposed between the clamping shoulder means of the crown cap and the other cap element to provide for ease of rotation of the crown cap relative to the other cap element when said clutch elements of the cap are separated.

18. In a filler cap of the type including: (a) a screw-threaded closure which during screw-on thereof to a screw-threaded filler neck develops resistance to screw-on torque between the closure and the filler neck, (b) a head for rotating the closure in opposite directions, and (c) a coupling between the head and closure which transmits torque from the head to the closure, but transmitting screw-on torque only to a limited preset amount; the improvement in the filler cap comprising, in combination: the coupling including first and second coupling means respectively rotatable with said head and closure, and when in an operative condition presenting abutable elements constructed and arranged for transmitting screw-on and screw-off torque therethrough from said head to said closure; and means operative, upon the screw-on torque attaining at least said present amount during screw-on of the closure to a filler neck, for automatically separating, and rendering inoperative to transmit any torque therethrough, said first and second coupling means, whereby said head is then free to be rotated in either of said opposite directions without any accompanying movement by the closure.

19. A filler cap construction as in claim 18 including second means for selectively restoring said separated first and second coupling means to said operative condition, so that rotation of the head in a screw-off direction then functions to effect accompanying movement by the closure.

20. A filler cap construction as in claim 18 including potentialized spring means operatively associated with one of said coupling means for moving said one coupling means axially, when the screw-on torque that is being transmitted through the coupling attains at least said preset amount.

21. A filler cap as in claim 20 including restoring means for selectively restoring the separated coupling means to said operative condition, said restoring means including a key-actuatable member rotatably carried by said head.

22. A filler cap as in claim 18 including restoring means for selectively restoring the separated first and second coupling means to said operative condition, said restoring means including a key-actuatable cylinder, that normally is immovable to frustrate unauthorized access to the coupling, but which, when entered by a proper key therefor, is rotatable to transmit force from the key to at least one of said coupling means to move same to restore the first and second coupling means to their operative condition.

* * * * *